July 30, 1968  E. W. RUPPEN, JR  3,395,076
COMPACT NUCLEAR REACTOR HEAT EXCHANGING SYSTEM
Filed Feb. 23, 1966  2 Sheets-Sheet 1

WITNESSES:
John L. Chopp
James F. Young

INVENTOR
Edward W. Ruppen, Jr.
BY
A. J. Santantonio
ATTORNEY

July 30, 1968  E. W. RUPPEN, JR  3,395,076
COMPACT NUCLEAR REACTOR HEAT EXCHANGING SYSTEM
Filed Feb. 23, 1966  2 Sheets-Sheet 2

United States Patent Office
3,395,076
Patented July 30, 1968

3,395,076
COMPACT NUCLEAR REACTOR HEAT
EXCHANGING SYSTEM
Edward W. Ruppen, Jr., Export, Pa., assignor to Westinghouse Electric Corporation, Pittsburgh, Pa., a corporation of Pennsylvania
Filed Feb. 23, 1966, Ser. No. 529,464
4 Claims. (Cl. 176—65)

ABSTRACT OF THE DISCLOSURE

A nuclear steam generating system is disclosed which is compact, and can therefore be sealably enclosed within a vapor container of reduced size and cost. An elongated vertically mounted reactor vessel is communicably coupled by concentric inlet and outlet conduits to an elongated horizontally mounted two-pass heat exchanger. The fluid moving unit for this steam generating equipment has its circulating means mounted within the heat exchanger, and is mounted in the same horizontal plane and longitudinally aligned with the heat exchanger thereby reducing the size, cost, and differential expansion problems of the system.

---

This invention relates in general to a compact heat exchanging arrangement and more particularly to a compact nuclear reactor system.

Present day hazard considerations require that the primary or reactor portion of a nuclear plant be contained within a sealed vapor container to prevent the escape of radioactive fluids or materials to the atmosphere in case of an accident or rupture in the primary or reactor portion of the plant. Therefore, all of the high pressure, high temperature components of the reactor portion of the plant are enclosed in the vapor container.

The size of the vapor container is based on the total energy released from a maximum credible accident. This accident assumes a rupture of the primary system with the release of virtually all of the available stored thermal energy, which generates a large quantity of vapor from the reactor coolant. These vapor containers, which may range in size up to 225 feet in the diameter or larger, represent a substantial portion of the total nuclear plant costs. Because of their size, the vapor containers have a major effect on overall plant design.

Since the vapor container has no equivalent counterpart in fossil fired power plants, it represents a costly penalty against the nuclear power plants. Therefore, a major reduction in the vapor container requirements would result in substantial savings in plant costs.

Furthermore, the larger nuclear power plants, which range in size up to 1000 mw.e, employ very large components including vertical heat exchangers requiring complex supports. Therefore, it is very desirable to simplify the arrangement and supports of the nuclear reactor components as much as possible. By simplifying the arrangement and reducing the overall size of the nuclear reactor system, it is possible to reduce substantially the capital and operating cost of the nuclear reactor system and further to reduce the reactor coolant inventory which is especially important in heavy water cooled nuclear plants.

Accordingly, it is the general object of this invention to provide a new and improved compact heat exchanging arrangement.

It is a more particular object of this invention to provide a novel compact nuclear reactor system.

Another object of this invention is to reduce substantially the size requirement of a vapor container of a nuclear power plant thereby reducing substantially the total plant costs.

Still another object of this invention is to reduce the capital and operating costs of a nuclear reactor system.

Another object is to simplify the supports for the nuclear reactor system by eliminating differential vertical expansion.

A further object of this invention is to reduce the reactor coolant inventory for the nuclear reactor system.

Another object of this invention is to integrate a portion of a fluid moving unit with a portion of a heat exchanger.

Briefly, the present invention accomplishes the above cited objects by communicably coupling, either closely or integrally, a heat source, a heat exchanger, and a fluid moving unit. One end portion of the heat exchanger is abutted against or closely coupled to the heat source. This is accomplished by concentric conduit structures forming inlet and outlet flow passages between the heat source and the heat exchanger. The fluid moving unit, which has a driving means and a circulating means, is secured to the other end of the heat exchanger with the circulating means thereof being enclosed within the end portion of the heat exchanger.

More specifically, the heat source, heat exchanger, and the fluid moving unit comprise a nuclear reactor, a heat exchanger, and a motor driven pump, respectively. The nuclear reactor is vertically disposed while the heat exchanger and the motor driven pump are horizontally disposed. The heat exchanger comprises an outer, elongated, generally cylindrical shell with a channel head at each end. A tube bundle having a plurality of tubes extends longitudinally between the channel heads. One end of the heat exchanger is communicably coupled to the reactor by means of concentric conduit structures which also incorporate the adjacent head. The aforementioned concentric conduit structures form an inner fluid flow channel and an outer annular fluid flow channel between the reactor and the heat exchanger. At the other end of the heat exchanger, the pump is integrally incorporated with the channel head with the pump impeller being enclosed within the channel head and with the channel head also serving as a portion of the pump casing. The pump motor, however, extends longitudinally outwardly from the channel head. Therefore, the conduit structure, heat exchanger, and motor driven pump have longitudinal axes which are horizontal and coplanar so as to eliminate differential vertical expansion thereamong. In operation the reactor coolant is heated as it passes through the nuclear core of the reactor. The coolant then flows out of the reactor, through the inner flow channel, and into the center cluster of tubes in the tube bundle contained within the heat exchanger. As the coolant flows through the tubes some of its heat is transferred to another fluid on the shell side of the heat exchanger. The coolant is then directed coaxially into the impeller and discharged radially outwardly from the impeller so as to be directed back into the tube bundle. The coolant then returns concentrically of the inlet flow through the tubes in the annular portion of the tube bundle. The coolant then gives up more of its heat to the secondary fluid on the shell side of the heat exchanger and then flows through the outer flow channel of the concentric conduit structures into the reactor. The coolant is then directed through the reactor core to begin the cycle again.

These and other objects and advantages of the present invention will become more apparent when considered in view of the following detailed description and drawings, in which:

FIGS. 1A and 1B, when taken side-to-side comprise a composite elevational view, partially in section, of a compact nuclear reactor system embodying an exemplary arrangement of this invention;

Figure 4:
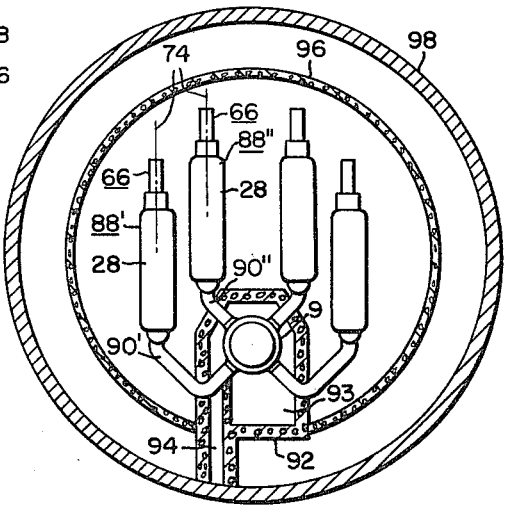
Figure 5:
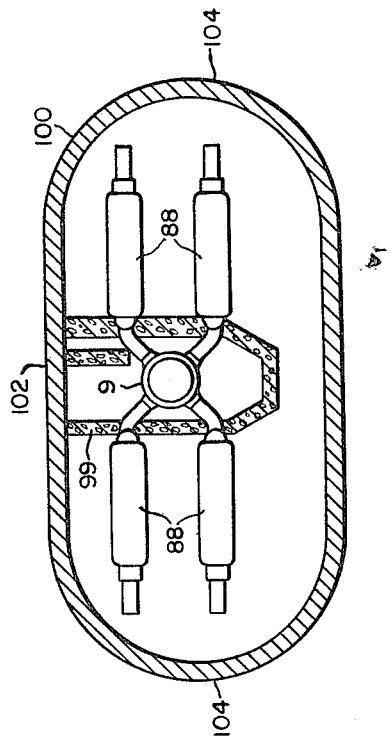

FIG. 4 is a top plan view, partially sectioned, of a vertical cylindrical vapor container containing a plurality of vapor generators and motor driven pumps compactly arranged with a single nuclear reactor; and FIG. 5 is a top plan view, partially sectioned, of an elongated vapor container containing an alternate compact arrangement of a plurality of vapor generators and motor driven pumps with a single nuclear reactor.

Figure 1A:
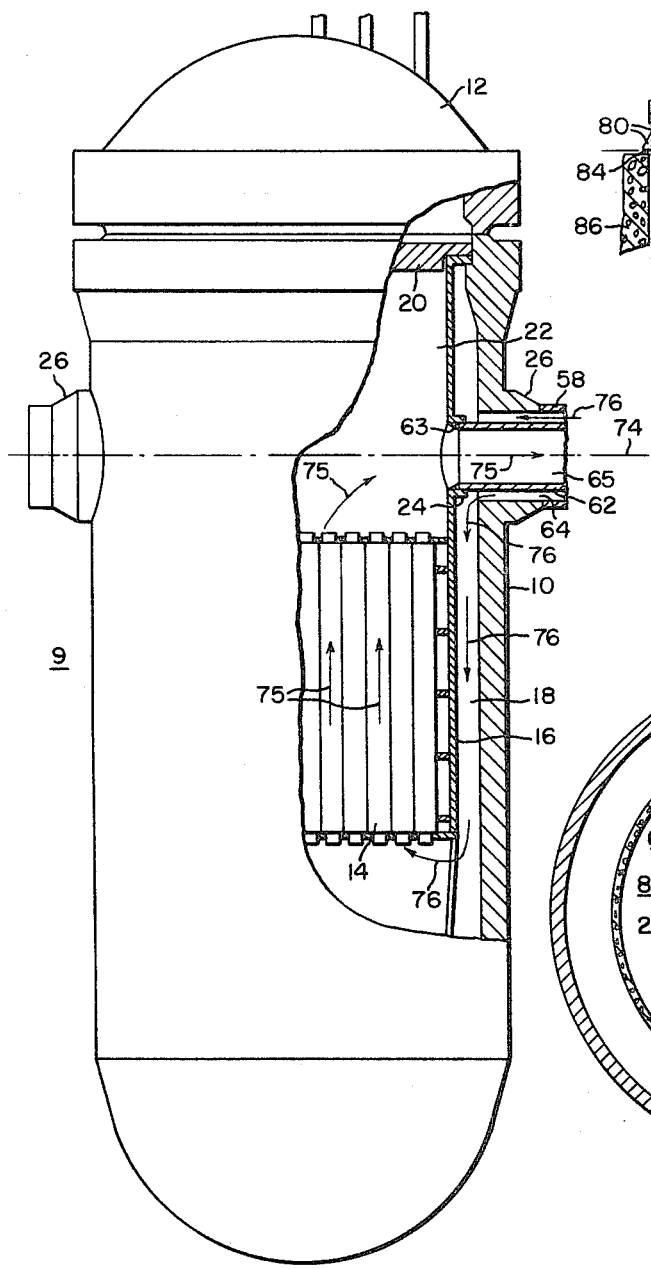
Figure 1B:
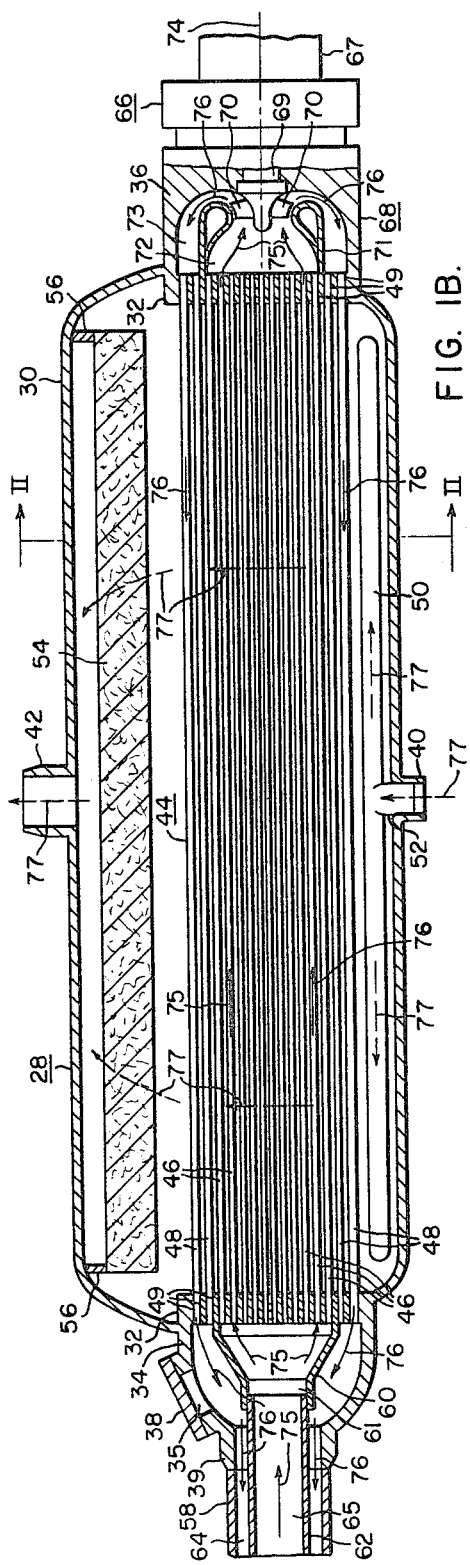
Figure 2:
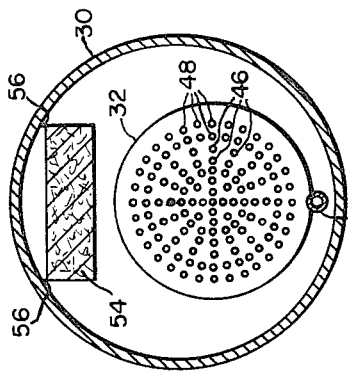
FIG. 2 is a cross-sectional view of the vapor generator taken along the line II—II of FIG. 1B.

In the embodiment of the invention illustrated in FIGS. 1 and 2, and more particularly FIG. 1A, a nuclear reactor 9 comprises a reactor vessel 10, a reactor head 12 on the vessel 10, and a reactor core 14 contained within the reactor vessel 10. A core barrel 16 supports the reactor core 14 and also forms an inlet channel 18 between the core barrel 16 and the reactor vessel 10. The core barrel 16 is supported at the upper end by the reactor vessel 10. A plate 20, which rests on the top of core barrel 16, cooperates with the upper portion of the core barrel 16 to form an outlet channel 22 above the reactor core 14. Outlet nozzle 24 and inlet nozzle 26, which are coaxially aligned, are formed in the bore barrel 16 and the reactor vessel 10, respectively. For additional information and details concerning the nuclear reactor 9, reference may be had to U.S. Patent No. 3,212,978, issued Oct. 19, 1965 to V. R. Short et al. and entitled "Nuclear Reactor Core Support Structures."

Referring now to FIGS. 1B and 2, there is shown a heat exchanger or vapor generator 28. The vapor generator 28 comprises an elongated, generally cylindrical shell 30 with openings at each end. Tube sheets 32 are disposed at each end opening of the shell 30 and are sealably secured to shell 30. Channel heads or water boxes 34 and 36, extend outwardly from each tube sheet 32 and are sealably secured to the ends of shell 30. Channel head 34 is generally hemispherically shaped and has an opening 35 which is sealably secured by manhole cover 38 in order to provide accessibility within channel head 34. Channel head 36 is annularly shaped with a generally cylindrical outer surface and with a generally hemispherically shaped inner surface. Shell inlet and outlet nozzles 40 and 42 are formed at approximately the middle of the elongate shell 30 and are oppositely disposed from one another.

Within the shell 30 a tube bundle 44 extends longitudinally between the tube sheets 32. The tube bundle 44 comprises a plurality of inner first pass tubes 46 forming a central cylindrical first pass region and a plurality of outer second pass tubes 48 forming an annular second pass region surrounding the inner tubes 46. In this example, the second pass tubes 48 are located in the two outermost rows of tubes, and the remainder of the tubes constitute the first pass tubes 46, as best shown in FIG. 2. The end portions 49 of each tube 46 and 48 in tube bundle 44 extend through the tube sheets 32, and the outer periphery of each end portion 49 is sealably secured to its respective tube sheet 32. Longitudinally disposed within shell 28 and positioned laterally between the tube bundle 44 and the shell inlet nozzle 40 is an elongated distribution conduit 50 having a plurality of flow openings (not shown) throughout its elongated length for the purpose of distributing a secondary fluid throughout the entire length of the vapor generator 28. A nozzle 52, which is formed at the middle of distribution conduit 50 extends into shell inlet nozzle 40 and is sealably secured thereto. Longitudinally disposed in the space between the tube bundle 44 and the shell outlet nozzle 42 is a moisture separator 54, such as a wire mesh device, supported by a solid rectangular baffle 56 which, in turn, is secured to the shell 30. The aforementioned baffle is so constructed that any fluid passing through outlet nozzle 42 must first pass through the moisture separator 54.

Returning now to the reactor end of the vapor generator 28, an outer conduit 58 extends between the nozzle portion 39 of channel head 34 to the reactor vessel nozzle 26 and is sealably secured to both nozzle 26 and 39. Disposed within the channel head 34 is a generally conical baffle 60, which is sealably secured to the tube sheet 32 and having its enlarged portion enclosing the inner first pass tubes 46. A concentric inner conduit 62 extends through outer conduit 58 from the smaller opening 61 of baffle 60 to core barrel nozzle 24. One end of inner conduit 62 enters the opening 61 of baffle 60 in a slip fit, and the other end of conduit 62 is sealably secured to core barrel nozzle 24 as for example the weld 63. Therefore, the outer structural means, which comprises the channel head 34, the outer conduit 58, and the reactor vessel nozzle 26 cooperates with the inner structural means, which comprises the conical baffle 60, the inner conduit 62 and the core barrel nozzle 24, to form an outer flow channel 64 and an inner flow channel 65; whereby the outer flow channel 64 couples the outer tubes 48 to the reactor inlet channel 18, and the inner flow channel 65 couples the inner tubes 46 to the reactor outlet channel 22. The inner structural means are also spacedly and concentrically disposed within the outer structural means.

Referring now to the other end of the vapor generator 28, a fluid moving unit or motor driven pump 66 is longitudinally and outwardly disposed from the vapor generator 28 and is coaxially aligned with the tube sheet 32. The motor driven pump 66 comprises a motor 67 and a pump means 68. The channel head 36 is also used as a portion of the pump casing for the pump means 68; thereby serving a dual role of both a channel head for the vapor generator 28 and a pump casing portion for pump means 68. A shaft 69 extends from the motor 67 through the channel head 36 and into the chamber formed by the channel head 36 and the tube sheet 32. Attached to the end of the shaft 69 is a pump impeller 70. An annular baffle 71 extends longitudinally outwardly from the tube sheet 32 and has one end sealably secured thereto. Baffle 71 cooperates with channel head 36 to form the entire casing for pump means 68. The inner surface of the baffle 71 is generally hemispherically shaped in order to direct efficiently the inlet fluid flow to the pump impeller 70. The baffle 71 is then curved radially outwardly and looped over the hemispherical section such that it comes into close proximity with the pump impeller 70 and also cooperates with the inner surface of the channel head 36 to produce an annular diffuser region. Therefore, the baffle 71, the channel head 36 and the tube sheet 32 cooperate with one another to form a central suction port 72 for impeller 70 and an annular outlet channel 73 from the pump impeller 70 which surrounds suction port 72 to provide concentric inlet and outlet flow paths from pump 66.

The motor driven pump 66 is coaxially aligned with the tube bundle 44 along center line 74. In addition, the tube bundle 44 is coaxially aligned with reactor vessel nozzle 26 along the same center line 74. The aforementioned coaxial alignment is advantageous in that the reactor 9, the vapor generator 28, and the motor driven pump 66 can be supported along the horizontal plane containing the center line 74 thereby eliminating the problem of vertical differential expansion among the aforementioned components. Examples of suitable supporting means for the aforementioned components will be described in greater detail hereinafter.

Operation

A primary or reactor fluid, for example, pressurized water, flows through and is heated by the reactor core 14. The primary fluid then flows through the outlet channel 22, the core barrel nozzle 24, the inner conduit 62, the baffle 60, the first pass tubes 46, and the baffle 71 as shown by flow arrows 75. The water is then directed by the inner surface of the baffle 71 into suction port 72 of the impeller 70. The impeller 70 then forces the water along a concentric annular reverse flow path formed by outlet channel 73, the outer or second pass heat exchange tubes 48, the outer flow channel 64, the reactor inlet channel 18, and into the reactor core 14 as shown by flow arrows 76. The cycle then repeats itself as the water again flows through the reactor core 14; wherein the energy required to force the water through the aforementioned cycle is supplied by the impeller 70 of the motor driven pump 66.

On the secondary or steam side of the vapor generator 28 a secondary fluid, for example feed water, enters the vapor generator 28 through shell inlet nozzle 40. The feed water then flows through nozzle 52 into the distribution conduit 50, as shown by dotted flow arrow 77. The feed water is distributed along the entire length of the vapor generator 28 by the distribution conduit 50. The secondary or shell side water, which includes the feed water and drain water from the moisture separator 54, then passes through the vapor generator 28 by flowing over the outer surfaces of both the inlet tubes 46 and outer tubes 48. As the shell side water flows over the outer surfaces of the tubes 46 and 48, heat is exchanged between the shell side water and the primary water flowing through the tubes 46 and 48 wherein the shell side water is heated and the primary water is cooled. No mixing occurs between the shell side water and the primary water, as the shell side water is sealably maintained on the shell side of the vapor generator 28 while the primary water is sealably maintained on the tube side of the vapor generator 28.

As the shell side passes through the vapor generator 28 it is converted to steam by the aforementioned heat exchange. The steam then flows through the moisture separator 54, where moisture contained in the steam is removed. The moisture removed by the moisture separator 54 is returned to the tube bundle 44 and mixed with the incoming feed water, while the moisture free steam flows out of the vapor generator 28 through shell outlet nozzle 42. The outlet steam is then used as processing steam or as steam to drive a prime mover such as a turbine generator. The flow path of the feed water and its subsequent conversion to steam while flowing through the shell side of the vapor generator 28 is denoted by dotted flow arrows 77.

Compact Nuclear Reactor System Arrangements

Figure 3:
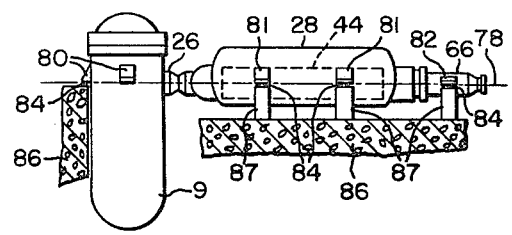
FIG. 3 is an elevational view, paritally sectioned, showing a single vapor generator radially aligned with and abutting a nuclear reactor and further showing simplified supports for the compact reactor system.

Referring now to FIG. 3 one arrangement of a compact nuclear reactor system is illustrated. In this arrangement the reactor 9 is vertically disposed, and the vapor generator 28 and motor driven pump 66 are horizontally disposed. The vapor generator 28 and the motor driven pump 66 are further coaxial and coplanar with the axis of reactor vessel nozzle 26. Thus, a horizontal plane 78 extending through the reactor vessel 10, the vapor generator 28 and the motor driven pump 66 also contains the center line 74 (FIGS. 1A and 1B) extending through the reactor vessel nozzle 26, the tube bundle 44 in vapor generator 28, and motor driven pump 66.

Also shown in FIG. 3 are the support means for the nuclear reactor system. Supports 80 secured to the vessel 10 are peripherally located thereon and upon reactor temperature changes allow for the expansion and contraction movement radially relative to an immovable vertical axis through the vessel 10. Supports 81 are longitudinally spaced from one another and are located on the outer surface of the vapor generator 28. Supports 82 are secured to opposite sides of the motor driven pump 66. In this example supports 80, 81 and 82 all rest on balls 84 which, in turn, rest on a fixed structure 86 which forms part of the reactor container (not shown in this figure) with the fixed structure 86 also including pillars 87. The expansion of the reactor vessel 10 occurs in a radially and horizontally outwardly direction, while the major part of the expansion for the vapor generator 28 and the motor driven pump 66 occurs in a longitudinal direction which is radial and outward from the reactor vessel 10. In addition, the lower surfaces of supports 80, 81 and 82 are all aligned in the same horizontal plane 78, thereby eliminating any vertical expansion problems.

Referring now to FIG. 4, there is illustrated a multi-loop primary system with a single reactor 9. Each primary loop 88′ has a motor driven pump 66, a vapor generator 28, and coaxial conduit means 90, with each conduit means 90 coupling the inlet and outlet flows of the reactor 9 to one of the heat exchangers 28. In this specific example each of the center lines 74 for each loop 88′ is coplanar and each loop is supported in the same manner as previously described for the arrangement in FIG. 3. A shielding and refueling structure 92 encloses reactor 9 and has a storage space 93 for reactor components and a refueling passage 94 which is used during the refueling of the reactor core 14 (FIG. 1A). A cylindrical secondary shield 96, which is open at the top, vertically surrounds the loops 88′ and a substantial portion of the refueling structure 92. Spaced outwardly from the secondary shield 96 is a generally cylindrical vapor container 98 having a hemispherically shaped enclosure at its top (not shown).

The reactor 9 is located off center of the vapor container 98 so as to reduce the length of the refueling passage 94 and thus the transport distance during refueling operations. The off center location of the reactor 9 also permits a compact multiloop arrangement wherein all of the vapor generators 28 and motor driven pumps 66 are located laterally to one side of the reactor 9.

Referring now to FIG. 5, there is illustrated another compact nuclear reactor system arrangement in which four primary loops 88 are utilized with a single reactor 9. In this arrangement a pair of loops 88 are longitudinally aligned with another pair of loops 88 with each pair being on opposite sides of the reactor 9. A shielding and refueling structure 99, similar in construction to the shielding and refueling structure 92 previously described, encloses the reactor 9. However, an elongated vapor container 100 is used to suitably enclose the reactor 9, all four primary loops 88 and the refueling structure 99. The reactor 9 is located off center from the longitudinal center line of vapor container 100. Vapor container 100 has an elongated generally cylindrical portion 102 with a generally hemispherically shaped portion 104 at each end of the cylindrical portion 102.

In summary, this invention has reduced the required number of reactor vessel nozzles by 50%, has substantially reduced or completely eliminated the piping requirements between the reactor vessel and the vapor generator, has utilized a horizontal vapor generator instead of a vertical vapor generator, has integrated the pump casing with the vapor generator channel head, has simplified the support requirements for the reactor system, has reduced the reactor coolant inventory, and has reduced the size of the vapor container by the utilization of a compact nuclear reactor system and by the reduction of the reactor coolant inventory. This invention has also reduced the pumping power requirement as a result of the reduced pressure drop in this compact nuclear reactor system and has also improved the pumping efficiency through the use of diffuser hydraulics in the discharge portion of the pump.

It will also be appreciated that various modifications may be made in this invention. For example, an expansion joint can be used in view of the slip fit joint contained within the channel head at the reactor end of the vapor generator. Also rods, spring-type hangers, or flexplates can be used to support the major components of the nuclear reactor system in lieu of the roller type supports described above. Furthermore, a heat exchanger may be used in lieu of a vapor generator wherein a primary fluid flows through the tubes or tube side of the heat exchanger in a heat exchange relationship with a non-vaporizing secondary fluid flowing over the tubes or shell side of the heat exchanger. Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

What is claimed as new is:

1. A compact nuclear reactor system comprising a nuclear reactor, said nuclear reactor comprising a vessel, a nuclear core within said vessel, said vessel having a nozzle secured thereto and having a core barrel spacedly disposed inwardly from said vessel forming inlet and outlet flow passages to and from said reactor core, an elongated horizontally extending heat exchanger having one end adjacent to and communicably coupled to said reactor, and a horizontally extending fluid moving unit communicably coupled to the other end of said heat exchanger, said unit having a circulation means disposed within said heat exchanger, said heat exchanger including a tube bundle formed by a plurality of tubes extending from said one end to said other end of the heat exchanger, coaxial structural means at said one end of said heat exchanger for communicably coupling some of said tubes at said one end to the reactor inlet flow passage and the remainder of said tubes at said one end to the reactor outlet flow passage, baffle means at said other end of said heat exchanger communicably coupling some of said tubes at said other end to a discharge side of said circulating means and the remainder of said tubes of said other end to an inlet side of said circulating means, said remainder of said tubes being inner tubes forming the inner portion of said tube bundle and said some of said tubes being outer tubes forming an outer annular portion of said tube bundle, said coaxial structural means comprising a tube sheet at said one end of said heat exchanger for supporting said tubes and for sealably securing the outer periphery of said tubes to said tube sheet, a head sealably secured to the outer peripheral portion of said tube sheet, said head having a nozzle at the outer end thereof, outer conduit means for sealably securing said head nozzle to said reactor vessel nozzle and communicably coupling said outer tubes to said reactor inlet flow passages, inner conduit means extending from said tube sheet through said reactor vessel nozzle to said core barrel, said inner conduit means spacedly disposed inwardly from said outer conduit means and communicably coupling said inner tubes to the reactor outlet flow passage, and means for allowing differential expansion between said inner conduit means and said outer conduit means.

2. A compact nuclear reactor system comprising an elongated vertically mounted pressure vessel, a nuclear core within said vessel, means within said vessel defining inlet and outlet flow passages for a liquid coolant passing vertically and upwardly through said reactor core, an elongated horizontally mounted heat exchanger including a vessel having one end adjacent to said pressure vessel, said heat exchanger having a plurality of tubes located in said heat exchanger vessel extending from said end adjacent said pressure vessel to the other end, a horizontally mounted fluid moving unit communicably coupled to said other end of said heat exchanger and having its horizontal axis in the same plane as the horizontal axis of said heat exchanger whereby horizontal expansional disturbances of the system are minimized, said fluid moving unit having its circulating means disposed within said heat exchanger vessel, inlet and outlet conduit means coupling said inlet and outlet flow passages of said pressure vessel with said one end of said heat exchanger vessel adjacent said pressure vessel, one of said conduits being disposed within the other of said conduits, coaxial structural means at said end of said heat exchanger vessel adjacent said pressure vessel for communicably coupling some of said tubes to one of said conduit means and the remainder of said tubes to the other of said conduit means, baffle means at said other end of said heat exchanger vessel communicably coupling said some of said tubes to the inlet side of said circulating means and the said remainder of said tubes to the discharge side of said circulating means, a separate container sealably enclosing said pressure vessel and a plurality of said heat exchangers and said fluid moving units, said pressure vessel having its vertical axis substantially displaced from the vertical axis of said container.

3. A compact nuclear reactor system comprising an elongated vertically mounted pressure vessel, a nuclear core within said vessel, means within said vessel defining inlet and outlet flow passages for a liquid coolant passing vertically and upwardly through the reactor core, an elongated horizontally mounted heat exchanger including a vessel having one end adjacent to said pressure vessel, said heat exchanger having a plurality of tubes located in said heat exchanger vessel extending from said end adjacent said pressure vessel to the other end, a horizontally mounted fluid moving unit communicably coupled to said other end of said heat exchanger and having its horizontal axis in the same plane as the horizontal axis of said heat exchanger whereby horizontal expansional disturbances of the system are minimized, said fluid moving unit having its circulating means disposed within said heat exchanger vessel, inlet and outlet conduit means coupling said inlet and outlet flow passages of said pressure vessel with said end of said heat exchanger vessel adjacent said pressure vessel, one of said conduits being disposed within the other of said conduits, coaxial structural means at said end of said heat exchanger adjacent said pressure vessel for communicably coupling some of said tubes to one of said conduit means and the remainder of said tubes to the other of said conduit means, baffle means at said other end of said heat exchanger vessel communicably coupling said some of said tubes to the inlet side of said circulating means and the remainder of said tubes to the discharge side of said circulating means, and said heat exchanger vessel, said plurality of tubes, said fluid moving unit, said circulating means, said coaxial structural means and said baffle means being longitudinally aligned in the same horizontal plane.

4. The compact nuclear reactor system of claim 3 wherein said same horizontal plane is substantially aligned with the plane defined by the points of support of said pressure vessel.

References Cited

UNITED STATES PATENTS

| | | | |
|---|---|---|---|
| 2,664,274 | 12/1953 | Worn et al. | 165—109 |
| 2,811,337 | 10/1957 | Andersen | 165—158 |
| 2,946,732 | 7/1960 | Wootton. | |
| 2,953,511 | 9/1960 | Lindley | 176—60 |
| 3,105,805 | 10/1963 | Rodwell | 176—60 X |
| 3,158,546 | 11/1964 | Cordova | 176—60 X |
| 3,182,002 | 5/1965 | Laithwaite et al. | 176—65 |
| 3,185,631 | 5/1965 | Long et al. | 176—65 |
| 3,194,744 | 7/1965 | Ainley et al. | 176—60 |
| 3,210,254 | 10/1965 | Fortescue | 176—60 |
| 3,287,226 | 11/1966 | Webb | 176—65 X |
| 3,291,695 | 12/1966 | Merli | 176—65 X |

FOREIGN PATENTS 800,385   8/1958   Great Britain.

REUBEN EPSTEIN, *Primary Examiner.*